US009612590B2

(12) United States Patent
Krenz et al.

(10) Patent No.: US 9,612,590 B2
(45) Date of Patent: Apr. 4, 2017

(54) MULTIPLEXING CONTROL OPERATIONS OF MOTORS

(71) Applicant: Hamilton Sundstrand Corporation, Charlotte, NC (US)

(72) Inventors: Michael Krenz, Roscoe, IL (US); Scott M. Thomson, Belvidere, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 331 days.

(21) Appl. No.: 14/295,939

(22) Filed: Jun. 4, 2014

(65) Prior Publication Data

US 2015/0355608 A1 Dec. 10, 2015

(51) Int. Cl.
*G05B 15/02* (2006.01)
*G05B 19/042* (2006.01)

(52) U.S. Cl.
CPC ........... *G05B 15/02* (2013.01); *G05B 19/042* (2013.01)

(58) Field of Classification Search
CPC ...................................................... G05B 15/02
USPC ............................................... 318/67, 66, 34
See application file for complete search history.

(56) References Cited

U.S. PATENT DOCUMENTS

| | | | |
|---|---|---|---|
| 6,583,591 B2* | 6/2003 | Echols | H02P 5/00 318/105 |
| 8,080,966 B2* | 12/2011 | Potter | B64C 13/50 318/111 |
| 8,421,393 B2* | 4/2013 | Pellen | H02P 5/74 318/112 |

* cited by examiner

*Primary Examiner* — David S Luo
(74) *Attorney, Agent, or Firm* — Cantor Colburn LLP (57) ABSTRACT

A system and method includes a multiplexed motor controller for controlling multiple motors with a weight and volume penalty comparable to that of a single controller system and method by receiving a plurality of inputs indicating a status, prioritizing a plurality of sub-systems based on the status, multiplexing a plurality of operation commands in accordance with the prioritization, and generating a plurality of waveforms in accordance with the operation commands.

12 Claims, 3 Drawing Sheets

MULTIPLEXING CONTROL OPERATIONS OF MOTORS

BACKGROUND

The disclosure relates generally to controlling motors, and more specifically, to multiplexing control operations from various initiators to motors.

In general, an operation system comprises a set of sub-systems that include a control initiator, motors, and a motor controller for each motor, where the control initiator operates each motor via a motor controller (e.g., each motor requires a motor controller for its operation). Further, each sub-system may generally be utilized for a specific task for a limited operational time (e.g. the sub-system may operate on a part-time basis).

When multiple part-time sub-systems are included in an operation system or environment, the part-time sub-systems are generally not in simultaneous operation. Further, when the part-time sub-systems are employed in an environment where cost, volume, and weight considerations are critical, these part-time sub-systems may disproportionally contribute to these considerations with respect to their operational time.

For example, an aircraft environment includes multiple part-time sub-systems for cargo handling, brake control, landing gear control, cabin environmental control, door operation, etc., that are utilized during ground operations and that are served with separate motor controllers. Further, the aircraft environment includes part-time sub-systems for hydraulic pump motors, flight control actuators, cabin environmental control (temperature and pressure), etc., that are utilized during flight operations and also employ individual motor controllers. For instance, the cargo sub-system utilizes a cargo interface or initiator to operate motors via motors controllers to move and organize cargo within an aircraft while the aircraft is on the ground, and the cargo sub-system remains unused while the aircraft is in flight. Thus, like most part-time sub-systems, the cargo sub-system contributes disproportionally to the cost, capacity, and weight of the aircraft, e.g., while in the air with respect to its operational time on the ground.

BRIEF DESCRIPTION OF THE INVENTION

According to one embodiment, a system includes a multiplexed motor controller for controlling multiple motors with a weight and volume penalty comparable to that of a single controller system and method by receiving a plurality of inputs indicating a status, prioritizing a plurality of sub-systems based on the status, multiplexing a plurality of operation commands in accordance with the prioritization, and generating a plurality of waveforms in accordance with the operation commands.

According to another embodiment, a method of receiving a plurality of inputs indicating a status, prioritizing a plurality of sub-systems based on the status, multiplexing a plurality of operation commands in accordance with the prioritization, and generating a plurality of waveforms in accordance with the operation commands.

According to yet another embodiment, a multiplexed controller configured to receive a plurality of inputs indicating a status, prioritize a plurality of sub-systems based on the status, multiplex a plurality of operation commands in accordance with the prioritization, and generate a plurality of waveforms in accordance with the operation commands.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As indicated above, when the part-time sub-systems are employed in an environment where cost, volume, and weight considerations are critical, these part-time sub-systems may disproportionally contribute to these considerations with respect to their operational time. Thus, what is needed is a system and method that enables part-time sub-systems to be fully operational when needed, while reducing their negative contributions to cost, volume, and weight.

In general, embodiments of the present invention disclosed herein may include a multiplexed control system, method, and/or computer program product that multiplexes control operations from various initiators of part-time sub-systems to motors such that a total number of motor controllers in an environment are reduced—thereby reducing contributions by each part-time sub-system to cost, volume, and weight totals of an environment.

For example, a multiplexed control system and method generally includes a multiplexed motor controller for controlling multiple motors with a weight and volume penalty comparable to that of a single controller. Systems and/or computing devices, such as multiplexed control system (e.g., system 1 and controller facility 101 of FIG. 1 and computing device 201 of FIG. 2 below), may employ any of a number of computer operating systems, including, but by no means limited to, versions and/or varieties of the AIX UNIX operating system distributed by International Business Machines of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, a handheld computer, a tablet device, a mobile device, bay-type computing device, or some other computing system and/or device.

In general, computing devices may include a processor (e.g., a processor 203 of FIG. 2) and a computer readable storage medium (e.g., a memory 204 of FIG. 2), where the processor receives computer readable program instructions, e.g., from the computer readable storage medium, and executes these instructions, thereby performing one or more processes, including one or more of the processes described herein (e.g., multiplexing control operations from various part-time systems to motors).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, the multiplexed control system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of the multiplexed control system and method.

Figure 1:
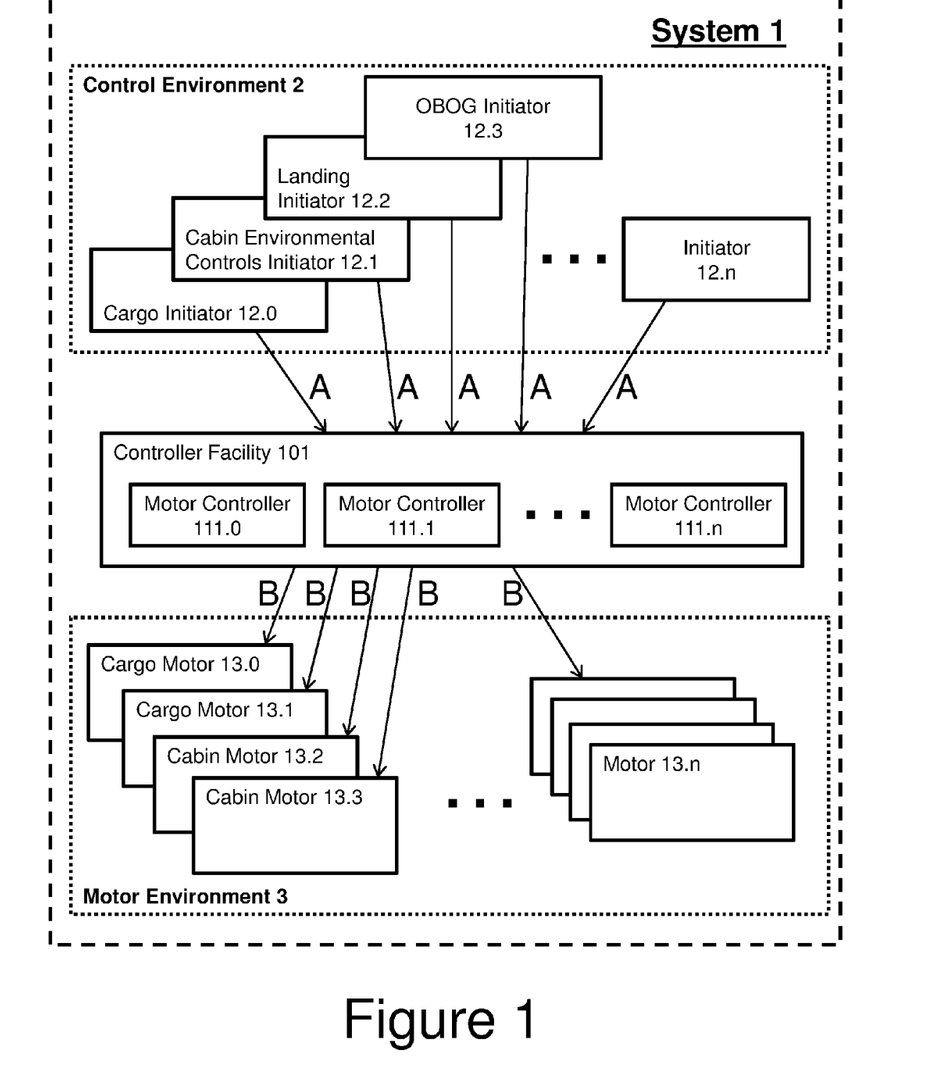
FIG. 1 illustrates a multiplexed control system.

FIG. 1 illustrates a multiplexed control system 1 that includes a control environment 2 and a motor environment 3, which respectively include a plurality of initiators 12 and a plurality of motors 13, where each initiator 12 corresponds to a set of motors 13. Each initiator 12 utilizes a controller facility 101, which includes a plurality of motor controllers 111, to operate to the motors 13, such that they form together a sub-system within the multiplexed control system 1. For instance, the controller facility 101 may utilize a plurality of motor controllers 111, where each motor controller 111 may act independently to prioritize which initiator 12 to listen to and which motor 13 to drive. Further, more than one motor controller 111 may listen to the same initiator 12 and perform drive functions based upon a plurality of inputs (as described below). For example, in an aircraft environment, a cargo sub-system may include a cargo interface 12.0 that corresponds to cargo motors 13.0, 13.1. The plurality of initiators 12, motors 13, and motor controllers 111 are illustrated as initiator 12.0 to initiator 12.n, motor 130.0 to motor 10.n, and motor controller 111.0 to motor controller 111.n, where 'n' is an integer representing a number each item within the system. The system 1, the initiators 12, and the controller facility 101 may include and/or employ any number and combination of computing devices and networks utilizing various communication technologies, as described above, that enable the controller facility 101 to multiplex control operations from the initiators 12 to the motors 13.

In operation, the controller facility 101 receives the plurality of inputs including a specified system state or adequate inputs to enable the determination of system state by the motor controller facility, which identifies an environmental condition of the system 1, and health indicators, which identify an operation condition of the initiator 12 and the corresponding the motors 13. The controller facility 101 utilizes the plurality of inputs to prioritize which sub-system has a right to utilize the motor controllers 111 at a certain time. Then, in response to receiving (e.g., arrows A) control operations or operation commands from the initiators 12 of the control environment 2 and in accordance with the prioritization, the controller facility 101 utilizes the motor controllers 111 to process operation commands by generating waveforms based on the operation commands and supplying (e.g., arrows B) the generated waveforms to the corresponding the motors 13 of the motor environment 3. Thus, prioritization and multiplexing by the controller facility of the system 1 reduces a total number of motor controllers in the system 1—thereby reducing contributions by each sub-system to cost, volume, and weight totals of system 1.

The multiplexed control system 1 in general is any environment that has motor initiators (e.g., then initiators 12), a multiplexed controller (e.g., the controller facility 101), and motors (e.g., the motors 13). Examples of the multiplexed control system 1 include aircraft environments, such as planes, helicopters, etc.; watercraft environments, such as boats, submarines, etc.; and the like. The initiators 12, the controller facility 101, and the motors 13 are connected via a network (e.g., an aircraft data network) that may comprise any combination of computing devices and connections that support communication as described above. The system state of the multiplexed control system 1 may be ascertained by the controller facility 101 from the network, acquired/received directly from the initiators 12, and/or detected by feedback from the motors 13. The systems state is directly related to a system type, for example, the system states of the aircraft environment may include 'grounded,' 'at terminal,' and 'in-flight' and the watercraft environment may include 'docked,' 'anchored,' and 'in-traveling.'

The control environment 2 is generally an instruction generation side of the system 1 that includes a plurality of initiators 12 that communicate (e.g., arrows A) control operations, signals, or operation commands, which are multiplexed by the controller facility 101.

The initiators 12 may include a mechanical device and/or a computing device configured to generate a plurality of operation commands that initiate action from a motor 13, where the mechanical and/or computing devices may be combined with hardware and/or software that supports sending the operation commands Examples of initiators include switches, buttons, levers, sensors (e.g., accelerometers), user interfaces, etc., and the signal from each initiator 12 may be different. For example, the cargo initiator 12.0 may provide a signal or an operation command to the controller facility 101 to initiate operation of one or more of the cargo motors 13.0, 13.1.

The motor environment 3 generally is an execution side of the system 1 that includes a plurality of motors 13 that receive (e.g., arrows B) waveforms generated and supplied by the controller facility 101.

The motor 13 is generally any device that creates motion, such as an electric motor and more particularly a variable frequency source motor. A variable frequency source motor (also termed multi-speed motor, variable-frequency drive adjustable-frequency drive, variable-speed drive, alternating current drive, micro drive, or inverter drive) is a type of adjustable-speed drive used in electro-mechanical drive systems (e.g., the sub-systems of system 1) to provide motor speed and torque by varying motor input frequency and voltage (e.g., the waveforms from controller facility 101). In addition, particular motors 13 may require closed-loop control to control and adjust the speed and torque of that particular motor 13.

The controller facility 101 (e.g., a multiplexed controller) is a computing device or plurality thereof that in accordance with a predetermined manner manage an electric motor (e.g., motor 13). The controller facility 101 is configured to perform starting and stopping the motor, selecting forward or reverse rotation, selecting and regulating the speed, regulating or limiting the torque, and protecting against overloads and faults. The controller facility 101 may include a computing device with a processor and a memory configured to receive and respond to a plurality of inputs (e.g., with respect to system 1 state and health) and a plurality of operation commands. The plurality of inputs when processed by the controller facility 101 identify a total system state, which includes system 1 status (e.g., when and aircraft is in-flight or on the ground) and/or initiator 12, motor controller 111, and motor 13 health (e.g., whether a component if operating without issue, such as a without fatigue failure). Thus, for example, a motor controllers' 111 health status, plus an aircraft state (e.g., in-flight or on the ground), plus an initiator 12 health status, plus the motor health status, all contribute (whether individually or collectively) to a prioritization of which motor controller 111 is used to control each motor 113 at a given point in time by the controller facility 101 (or by the motor controllers 111 themselves).

For example, the controller facility 101 may be in direct communication with a plurality of initiators 12 and in direct communication with a plurality of motors 13, where each initiator 10 outputs a different format of operation commands and each motor 13 receives a different waveform. In turn, the controller facility 101 recognizes each of the different formats so that the system 1 may be controlled according to the operation commands generated by the initiators 12. Further, because a signal or operation command may be received from more than one initiator 12 at a time, the controller facility 101 is configured to process the coincident signals in parallel and/or via concurrent processing. With respect to parallel and/or concurrent processing, operation commands from different initiators 12 may be prioritized based on the associated motor 13 operability. That is, when signals from two different initiators 12 are received at the same time, an associated priority, implemented as a look-up table, for example, may be used to determine the order in which the signals are processed by the controller facility 101.

For instance, the controller facility 101, in response to and in accordance with a received plurality of inputs from the system 1, prioritizes the sub-systems (and in turn their respective initiators 12 and associated motor 13). Further, the controller facility 101 in accordance with the prioritization of the sub-systems assigns or associates motor controllers 111 to each sub-system based on the requirements of that sub-system.

For example, if the controller facility 101 includes six motor controllers (111.0 through 111.5, where n is equal to six minus one) and the cargo sub-system requires two motors (motors 13.0 to 13.1) then two motor controllers (111.0 thorough 111.1) will be assigned to the cargo sub-system.

As another example, the controller facility 101 may include three motor controllers 111 that are available to listen to three initiators 12 and control/drive three motors 13. When only two of the motor controllers (e.g., a first motor controller 111 and a second motor controller 111) are operational/healthy, the first and second motor controllers 111 will choose to listen to three initiators 12 based upon priority. That is, the first motor controller 111 may listen to a first initiator 12 and drive a first motor 13, while the second motor controller 111 may listen to a second initiator 12 and drive a second motor 13. Similarly, when only two of the motor controllers (e.g., the second motor controller 111 and a third motor controller 111) are operational/healthy, the second and third motor controllers 111 will choose to listen to three initiators 12 based upon priority. That is, the second motor controller 111 may listen to a first initiator 12 and drive a first motor 13, while the third motor controller 111 may listen to a second initiator 12 and drive a second motor 13. Thus, each motor controller of the plurality of motor controllers 111 are capable of performing prioritization and prioritization of which initiator 12 is listened to by each motor controller 111 is determined by the total system state.

In yet another embodiment, based on the types of motors 13 that are controlled by the controller facility 101, neither parallel nor concurrent processing may be necessary. For example, the motors 13 shown in FIG. 1 may not be initiated simultaneously based on a normal operation of the system 1, thereby precluding a need for the controller facility 101 to handle simultaneous initiator 12 signals.

Further, the controller facility 101 is configured to process in-real time the needs of the sub-systems, availability of the motor controllers 111, and priority of the system 1 such that critical and emergency systems are always operations. The controller facility 101 is also configured to receive (e.g., arrows A) operation commands from the initiators 12, and utilize the motor controllers 111 associated with those initiators to generate waveforms in accordance with the operation commands The controller facility 101 is configured to supply (e.g., arrows B) the generated waveforms to the corresponding the motors 13.

The motor controllers 111 may include any hardware, software, or combination of hardware and software utilized by the controller facility 101 to provide waveforms that operate the motors 13. As discussed above, individual controllers include cost, volume, and weight penalties for installation into a system 1 that may not be offset by utilization needs. However, because multiple motor controllers 111.0 to 111.n are integrated into the controller facility 101, which provides a total cost, volume, and weight penalty comparable to that of a single controller, utilization with respect to a very small portion of the system 1 is proportionate to the cost, volume, and weight penalty of the controller facility 101.

The system 1 and elements therein may take many different forms and include multiple and/or alternate components and facilities. While an exemplary system 1 is shown in FIG. 1, the exemplary components illustrated in FIG. 1 are not intended to be limiting. Indeed, additional or alternative components and/or implementations may be used.

The multiplexed control system 1 will now be described with reference to an aircraft environment; however, the use of the aircraft environment is for ease of explanation and in no way is the multiplexed control system 1 intended to be limited to the aircraft environment. Further, in view of the aircraft environment above, the controller facility 101 will be described with reference to FIG. 2, and the operations of the controller facility 101 will be described with reference to FIG. 3.

Figure 2:
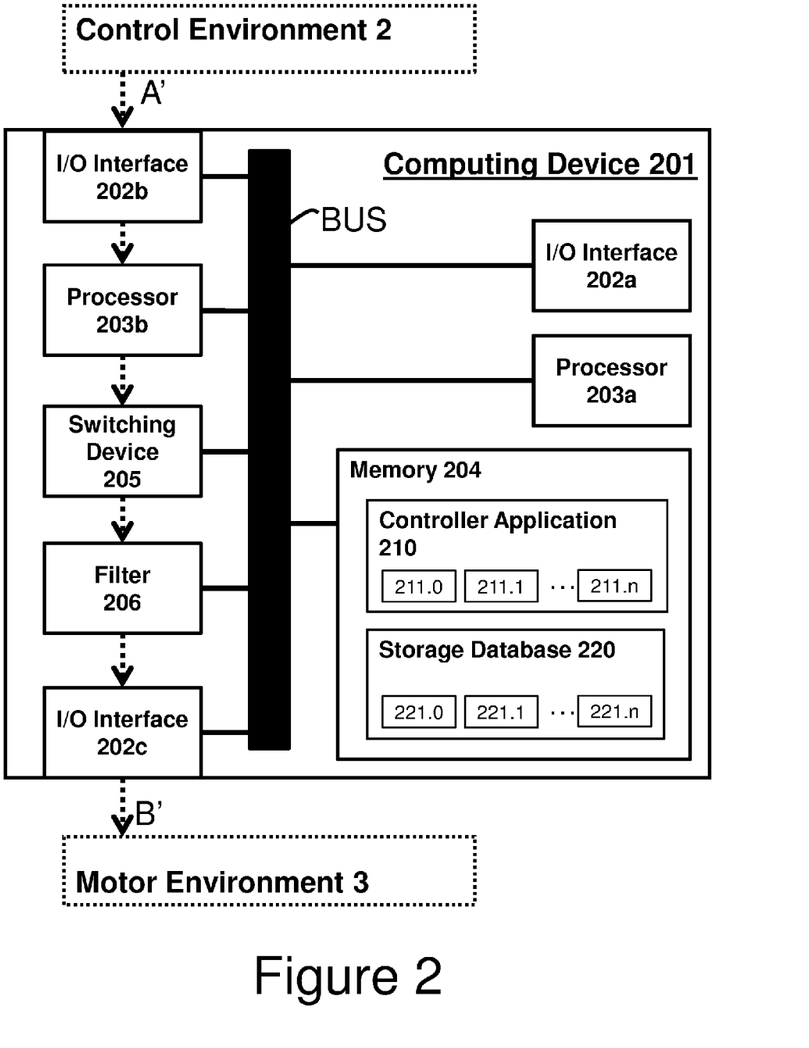
FIG. 2 illustrates a computing device schematic configured to multiplex control operations.

FIG. 2 illustrates a computing device 201 (e.g., a controller facility 101 implemented in a computing device as described above) configured to receive and utilize operation commands to generate and supply waveforms that includes one or more input/output (I/O) interfaces 202 (e.g., I/O interfaces 202a, 202b, 202c), processors 203 (e.g., processors 203a, 203b), memories 204, power switching devices 205, and filters 206, each of which communicates via a system bus (e.g., BUS). Further, the computing device 201 includes a controller application 210, which includes controller modules 211, and a storage database 220, which manages priority tables 221, on the memory 204. In general, the processor 203a of the computing device receives computer readable program instructions as defined by the application 210 from the memory 204 and execute these instructions, thereby performing one or more processes, such as multiplexing operation commands via the modules from various initiators 12 of part-time sub-systems to motors 13 (e.g., the computing device 201 multiplexes the plurality of inputs through the I/O interfaces 202) in accordance with the priority tables 221.

The computing device 201 may be a bay-type computing device that includes a back plain for receiving multiple processing cards. Further, the computing device 201 is connected to the aircraft data network so that the application 210 may detect the state and operational needs of the aircraft (e.g., detect and respond to the operational needs in accordance with the system states of 'grounded' and 'in-flight') as further described below. Thus, when installed in an aircraft environment, the computing device may be modified to include a plurality of processing cards, where each card includes software and hardware receiving inputs and operation commands and outputting waveforms.

The input/output (I/O) interface 202 may include a physical and/or virtual mechanism utilized by the computing device 201 to communicate between elements internal and/or external to the computing device 201. That is, the I/O interface 202 may be configured to receive or send signals or data within or for the computing device 201. For example, the I/O interface 202a is configured to receive a plurality of inputs indicating a system state and health from the aircraft data network, I/O interface 202b is configured to receive (e.g., arrow A') an operation command from an initiator 12, and I/O interface 202c is configured to send (e.g., arrow B') a waveform to a motor 13. An example of the I/O interface 202 may include a network adapter card or network interface configured to receive computer readable program instructions from the aircraft data network and forward the computer readable program instructions or the like for storage in a computer readable storage medium (e.g., memory 204) within the respective computing/processing device (e.g., computing device 201).

The processor 203 may include any processing hardware, software, or combination of hardware and software utilized by the computing device 201 that carries out the computer readable program instructions by performing arithmetical, logical, and/or input/output operations. Examples of the processor 203 include, but are not limited to an arithmetic logic unit, which performs arithmetic and logical operations; a control unit, which extracts, decodes, and executes instructions from a memory; an array unit, which utilizes multiple parallel computing elements; and a digital signal processor (e.g., processor 202b), which is a specialized microprocessor with an architecture optimized for the operational needs of digital signal processing.

The memory 204 may include a tangible device that retains and stores computer readable program instructions, as provided by the controller application 210, for use by the processors 203 of the computing device 201. For example, the memory 204 may store a controller application 210 configured to multiplex operation commands or signals from initiators 12. Further, the memory 204 may manage the storage database 220 that stores the plurality of look-up tables 221 prioritizing the sub-systems connected via the computing device 201, so that concurrently received signals from initiators 13 may be processed based on the priority of the associated sub-system.

The switching device 205 may include an electronic component or device that can switch an electrical circuit, interrupting the current or diverting it from one conductor to another. An example of the switching device includes insulated gate bipolar transistors.

The filter 206 may include any processing hardware, software, or combination of hardware and software utilized by the computing device 201 that addresses electromagnetic noise generated on the waveforms to the motors 13.

The controller application 210 may include computer readable program instructions configured to receive (or query for) a plurality of inputs indicating a system status result (e.g., system state and health), generate priority tables 221 based on the inputs, multiplex operation commands based on the priority tables 221, and generate waveforms in accordance with the operation commands.

A query, in general, is an information retrieval activity of obtaining information relevant to an information need (e.g., desire to discover the system state and health). Information retrieval activity initiates searches based on metadata, full-text indexing, timers or sampling rates, etc. Thus, for example, the query may initiate or cause the application 210 to perform a prioritization process. Further, a query may be received and/or generated in response to a user input indicating a search for information.

The system status result, in general, is an input and/or notification mechanism for delivering and/or identifying information targeted by the query (or non-existence of the information) to the application 210 for prioritization and/or notification. Examples of notification mechanisms may include, but are not limited to, illuminated lights, text messaging (e.g., SMS), audio alerts (e.g., telephone calls, cellphone calls, VoIP calls, voicemails, loudspeaker announcements, etc.), electronic mail (e.g., POP, IMAP, SMTP), desktop alerts (e.g., dialog, balloon, modal window, toast, etc.), pager (e.g., SNPP), instant messaging (e.g., IRC, ICQ, AIM, Yahoo! Messenger, MSN, XMPP, iMessage), and the like.

The controller application 210 is configured to receive (or query for) a plurality of inputs indicating a system status result by ascertaining from the aircraft data network Boolean indicators and/or variable conditions of different components of the aircraft. Further, the Boolean indicators and/or variable conditions may be acquired directly from the initiators 12 and/or detected by feedback from the motors 13.

For example, via the aircraft data network, the application 210 may ascertain the 'grounded' state based on the Boolean indicator for 'weight on wheels.' That is, landing gear of the aircraft include pressure sensor that outputs a zero when pressure is less than a threshold and a one when the pressure is greater than a threshold. The application 210 may sample (at a per-second rate or division thereof) the outputs of the pressure sensor to detect when the 'weight on wheels' equals a one and thus, detect that the aircraft is in a 'grounded' state.

Further, via a direct connection, the application 210 may sample a variable alternating current (AC) output voltage of an electromechanical transducer (e.g., a rotary variable differential transformer) that is linearly proportional to an angular displacement of an aircraft thruster shaft. Therefore, because the AC output voltage is linear within a specified range over the angular displacement of the aircraft thruster shaft, the application detects a speed of the aircraft and can decipher an 'in-flight' state (e.g., if the speed is lower than a first threshold then the aircraft is grounded, if the speed is between second and third thresholds then the aircraft is cruising as a first altitude, etc.).

Furthermore, the application, via the Boolean indicators and/or variable conditions detects the health of the components of the aircraft. Such as, if when an aircraft moving cargo a first motor is not responding to the application 210 (e.g., the first motor is not replying to status check signals), the application may engage a second motor to perform the operation of the first motor.

The controller application 210 is configured to generate the priority tables 221 based on the plurality of inputs and cause the priority tables 221 to be stored in the database 220. Each priority table corresponds to a different set of conditions defined by the system status results and dictates which sub-systems should receive the services of any available modules 211. The application 210 may also include a configuration file to identify a type of motor 13 within each sub-system and a priority among the motors 13 based on the system status result. The configuration file may be updated to add motors or to change priorities as needed.

The application 210 includes and is configured to utilize the modules 211 to dictate how the processor 203b should interleave the processing of a newly received operation command from an initiator 12. The modules 211 (e.g., motor controller 111) may include computer readable program instructions configured to multiplex operation commands based on the priority tables 221 and generate waveforms in accordance with the operation commands. As illustrated in FIG. 2, the application 210 includes a plurality of modules 211, illustrated as module 211.0 to modules 211.n, where 'n' is an integer representing a number of modules 211.

For example, based on a previously received signal from another initiator 12, the application 210 utilizes the module 211.0 to provide a closed loop control of the motor 13. Further, because the modules of the application 210 are fewer in number than the number of motors 13 in the system 1, the application 210 utilizes the module 211 to perform parallel processing of initiator 12 signals received at the same time according. Furthermore, the multiple multiplexed modules 111 may operate in tandem in an order dictated by the priority table 221.

Thus, if the application 210 via queries discovers that an operation condition of an aircraft environment is a 'in-flight' and that the health state of the landing sub-system includes a malfunction (e.g., the primary motor of the landing gear is not responding to the application 201), then the application 210 may generate a corresponding system status result that is utilized to prioritize the motor controllers 211 to alleviate the malfunction (e.g., engage multiple landing gear motors until a motor subsequent to the primary motor response to the waveform signals) and notify the users responsible for the landing sub-system.

While single items are illustrated for the application 210 (and other items) by FIG. 2, these representations are not intended to be limiting and thus, the application 210 items may represent a plurality of applications. In addition, although one modular breakdown of the application 210 is offered, it should be understood that the same operability may be provided using fewer, greater, or differently named modules. Although it is not specifically illustrated in the figures, the applications 210 may further include a user interface module and an application programmable interface module; however, these modules may be integrated with any of the above named modules. A user interface module may include computer readable program instructions configured to generate and mange user interfaces that receive inputs and present outputs. An application programmable interface module may include computer readable program instructions configured to specify how other modules, applications, devices, and systems interact with each other.

The storage database 220 may include a database, as described above, capable of storing priority tables 221. The storage database 220 may include a database, data repository or other data store and may include various kinds of mechanisms for storing, accessing, and retrieving various kinds of data, including a hierarchical database, a set of files in a file system, an application database in a proprietary format, a relational database management system (RDBMS), etc. The storage database 220 may generally be included within the memory 204 of the computing device 201 employing a computer operating system such as one of those mentioned above, and are accessed via a network in any one or more of a variety of manners. The storage database 220 is in communication with the application 210 of and/or applications external to the computing device 201, such that information, the plurality of inputs and operation commands may be collected and archived in support of the processes described herein (e.g., multiplexing process). As illustrated in FIG. 2, the storage database 220 includes a plurality of priority tables 221, illustrated as priority tables 221.0 to data structure 221.n, where 'n' is an integer representing a number priority tables archived by the storage database 220. Although one exemplary numbering sequence for the records of the storage database 220 is offered, it should be understood that the same operability may be provided using fewer, greater, or differently implemented sequences. The storage database 220 may be a part of the application 210, run independently within the same device or system as the application 210 (as illustrated in FIG. 2), or be an external to and in communication with the application 210. In operation, for example, the storage database 220 may collect and archive the plurality of inputs indicating the state and health of the system 1 received via I/O interface 203a. The storage database 220 may further communicate with other systems that may be internal or external to system 1 to collect and archive operation commands, in support of tracking the state, health, and performance of the system 1. The configuration file stored within the storage database 221 and shared among the multiple modules 111. The configuration file may be stored within of each module 111). The configuration file may be updated so that each module 111 stores the same information in the configuration file. In alternate embodiments, each configuration file of each of the multiple modules 111 may be different. Each module 111 may prioritize a different motor 120 based on its individual configuration file and/or the priority tables 221.

Figure 3:
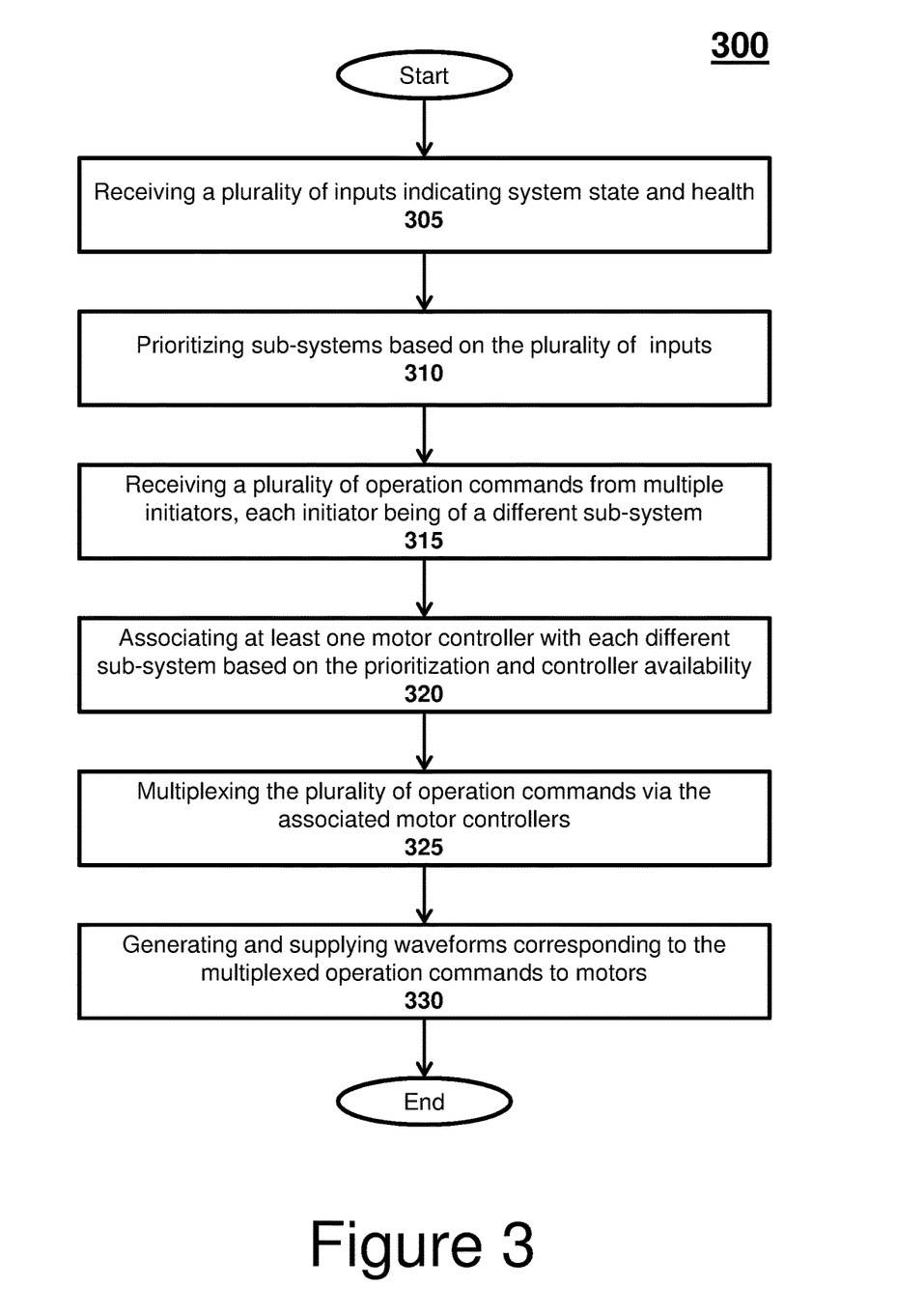
FIG. 3 illustrates an exemplary process flow of multiplexed control system.

The application 210 will be described with reference to FIG. 3 and in view of the aircraft environment example above. FIG. 3 illustrates a process flow 300 of the system 1. The process 300 is not limiting an order or grouping of operation blocks. In fact, the operation blocks may be executed in sequence, concurrently, or the operation blocks may sometimes be executed in the reverse order, depending upon the operability involved.

The process 300 begins at block 305 where the application 210 receives a plurality of inputs indicating system state and health. At block 310, the application 210 prioritizes the sub-systems based on the plurality of inputs to generate priority tables 221. For example, the application 210 discovers whether the use of multiplexed motor controllers 111 should be for aircraft ground operations or potentially additional aircraft flight operations, which are mutually exclusive from one another in terms of time utilized. When the operation condition is 'ground,' the cargo handling, brake control, and cabin environmental control sub-systems are prioritized. Further, because receiving multiple operation commands from multiple initiators 12 may be coincidental, the prioritization by the application may be a real time on-demand determination based on an immediate set of queries or via consulting a priority tables stored by the storage database 220 of the memory 204 to determine which signal relates to initiating operation of a higher priority motor 13 (e.g., higher priority sub-system).

The process 300 proceeds to block 315 where the application 210 receives a plurality of operation commands (e.g., arrows A) from multiple initiators 12, each initiator being of a different sub-system. At block 320, the application 210 associates at least one motor controller (e.g., module 111) with each different sub-system based on the prioritization and controller availability (e.g., priority tables 221).

The process 300 proceeds to block 325 where the application 210 multiplexes the plurality of operation commands via the associated motor controllers 111. At block 330 the application 210 generates and supplies waveforms corresponding to the multiplexed operation commands to motors. For example, the application 210 determines whether there is a need for closed loop control of the motor 12 associated with the operation command being processed. Based on a result of the prioritizing or an operation signal received signal (block 315) and based on a decision regarding closed loop control, the application 210 generates a waveform to output to the associated motor 13 or generates a waveform while implementing the closed loop control of the associated motor 13 to adjust speed and torque as needed. When multiple operation signals are being processed, the priority determined at block 310 may be used to determine how to interleave the closed loop control with generating a waveform for another motor 13.

Then, the process 300 ends.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:
   receiving, by a processor, a plurality of inputs indicating a system status result;
   prioritizing, by the processor, a plurality of sub-systems based on the system status result;
   multiplexing, by the processor, a plurality of operation commands in accordance with the prioritizing of the plurality of sub-systems; and
   generating, by the processor, a plurality of waveforms in accordance with the operation commands,
   wherein the prioritizing of the plurality of sub-systems further comprising generating a plurality of priority tables utilizing the plurality of inputs, each priority table including a multiplex order for the plurality of operation commands which corresponds to condition of the system status result.

2. The method of claim 1, wherein the system status result indicates whether a system is in at least one of a first state and a second state.

3. The method of claim 2, wherein the system is an aircraft environment and the first state is a grounded state.

4. The method of claim 2, wherein the system status result indicates a health status of the plurality of sub-systems.

5. The method of claim 1, further comprising:
   receiving the operation commands from a plurality of initiators, each initiator being included in one of the plurality of sub-systems.

6. The method of claim 1, further comprising:
   providing each waveform of the plurality of waveforms to a corresponding motor of a plurality of motors, each motor being included in one of the plurality of sub-systems.

7. A computer program product, the computer program product comprising a computer readable storage medium having program instructions embodied therewith, the program instructions executable by a processor to cause:
   receiving a plurality of inputs indicating a system status result;
   prioritizing a plurality of sub-systems based on the system status result;
   multiplexing a plurality of operation commands in accordance with the prioritizing of the plurality of sub-systems; and
   generating a plurality of waveforms in accordance with the operation,
   wherein the prioritizing of the plurality of sub-systems further comprising generating a plurality of priority tables utilizing the plurality of inputs, each priority table including a multiplex order for the plurality of operation commands which corresponds to condition of the system status result.

8. The computer program product of claim 7, wherein the system status result indicates whether a system is in at least one of a first state and a second state.

9. The computer program product of claim 8, wherein the system is an aircraft environment and the first state is a grounded state.

10. The computer program product of claim 8, wherein the system status result indicates a health status of the plurality of sub-systems.

11. The computer program product of claim 7, further comprising:
    receiving the operation commands from a plurality of initiators, each initiator being included in one of the plurality of sub-systems.

12. The computer program product of claim 7, further comprising:
    providing each waveform of the plurality of waveforms to a corresponding motor of a plurality of motors, each motor being included in one of the plurality of sub-systems.

* * * * *